(12) United States Patent
Tajima

(10) Patent No.: US 7,924,790 B2
(45) Date of Patent: *Apr. 12, 2011

(54) RADIO BASE STATION APPARATUS AND BASE STATION CONTROLLER

(75) Inventor: Yoshiharu Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,450

(22) Filed: Feb. 2, 2010

(65) Prior Publication Data
US 2010/0177729 A1 Jul. 15, 2010

Related U.S. Application Data

(62) Division of application No. 10/789,749, filed on Feb. 27, 2004, now Pat. No. 7,684,369.

(30) Foreign Application Priority Data

Mar. 25, 2003 (JP) .................................. 2003-082830

(51) Int. Cl.
*H04B 7/216* (2006.01)
(52) U.S. Cl. ........ 370/335; 370/338; 370/401; 455/446; 455/560
(58) Field of Classification Search .................. 370/329, 370/331, 352, 401; 455/446, 560
See application file for complete search history.

(56) References Cited

U.S. PATENT DOCUMENTS

| | | | |
|---|---|---|---|
| 5,101,501 A | 3/1992 | Gilhousen et al. | |
| 5,432,843 A | 7/1995 | Bonta | |
| 5,717,688 A | 2/1998 | Belanger et al. | |
| 5,850,503 A | 12/1998 | Onken | |
| 6,108,547 A | 8/2000 | Yamashita et al. | |
| 6,195,705 B1 | 2/2001 | Leung | |
| 6,393,482 B1 | 5/2002 | Rai et al. | |
| 6,434,134 B1 | 8/2002 | La Porta et al. | |
| 6,487,406 B1 | 11/2002 | Chang et al. | |

(Continued)

FOREIGN PATENT DOCUMENTS

EP          1 128 704          8/2001

(Continued)

OTHER PUBLICATIONS

U.S. non-final Office Action Issued Jun. 4, 2009 for U.S. Appl. No. 10/789,749.

(Continued)

*Primary Examiner* — Sharad Rampuria
(74) *Attorney, Agent, or Firm* — Katten Muchin Rosenman LLP

(57) ABSTRACT

The invention provides a radio base station apparatus forming a wireless zone in a mobile communication system and to a base station controller performing channel control over a terminal visiting a wireless zone. The radio base station apparatus has an identifying section identifying a particular radio base station that is to maintain a radio channel between the radio base station apparatus and a terminal during a process of diversity handover, a network interface section delivering a signal to a network if a local station is not the particular radio base station, and an inter-office interface section delivering to the network a composite wave of the signal and a signal having arrived and forwarded from the terminal via the radio channel at a radio base station forming a wireless zone adjacent to a wireless zone formed by the local station if the local station is the particular radio base station.

18 Claims, 7 Drawing Sheets

U.S. PATENT DOCUMENTS

| | | |
|---|---|---|
| 6,578,066 B1 | 6/2003 | Logan et al. |
| 6,628,632 B1 | 9/2003 | Dolan |
| 6,674,734 B1 | 1/2004 | Hsu et al. |
| 6,785,256 B2 | 8/2004 | O'Neill |
| 6,810,259 B1 | 10/2004 | Zhang |
| 6,965,584 B2 | 11/2005 | Agrawal et al. |
| 7,069,050 B2 | 6/2006 | Shousei |
| 7,162,247 B2 * | 1/2007 | Baba et al. ............... 455/446 |
| 7,418,510 B2 | 8/2008 | Sakakura |
| 7,505,433 B2 | 3/2009 | Yaqub et al. |
| 7,564,824 B2 | 7/2009 | O'Neill |
| 7,684,369 B2 * | 3/2010 | Tajima ............... 370/331 |
| 2001/0018346 A1 | 8/2001 | Okajima et al. |
| 2002/0131386 A1 * | 9/2002 | Gwon ............... 370/338 |
| 2002/0173303 A1 * | 11/2002 | Shibutani ............... 455/426 |
| 2003/0016655 A1 | 1/2003 | Gwon |
| 2003/0117978 A1 | 6/2003 | Haddad |
| 2003/0193912 A1 * | 10/2003 | O'Neill ............... 370/331 |
| 2003/0224795 A1 | 12/2003 | Wilhoite et al. |
| 2004/0213181 A1 | 10/2004 | Grech et al. |
| 2005/0286466 A1 | 12/2005 | Tagg et al. |
| 2006/0245403 A1 | 11/2006 | Kumar |
| 2007/0097917 A1 | 5/2007 | Kang |

FOREIGN PATENT DOCUMENTS

| | | |
|---|---|---|
| JP | 54-100206 | 8/1979 |
| JP | 3-73627 | 3/1991 |
| JP | 10-117165 | 5/1998 |
| JP | 10-190633 | 7/1998 |
| JP | 11-122672 | 4/1999 |
| JP | 2000-183945 | 6/2000 |
| JP | 2000-286898 | 10/2000 |
| JP | 2001-045534 | 2/2001 |
| JP | 2001-285917 | 10/2001 |
| WO | WO 96-08908 | 3/1996 |

OTHER PUBLICATIONS

U.S. final Office Action Issued Oct. 24, 2008 for U.S. Appl. No. 10/789,749.

U.S. non-final Office Action Issued Mar. 7, 2008 for U.S. Appl. No. 10/789,749.

Japanese Office Action issued Sep. 25, 2007 for corresponding Japanese Application No. 2003-082830.

U.S. Advisory Action Issued Nov. 19, 2007 for U.S. Appl. No. 10/789,749.

U.S. final Office Action Issued Jul. 18, 2007 for U.S. Appl. No. 10/789,749.

U.S. non-final Office Action Issued Feb. 9, 2007 for U.S. Appl. No. 10/789,749.

U.S. final Office Action Issued Jun. 29, 2006 for U.S. Appl. No. 10/789,749.

U.S. non-final Office Action Issued Dec. 19, 2005 for U.S. Appl. No. 10/789,749.

* cited by examiner

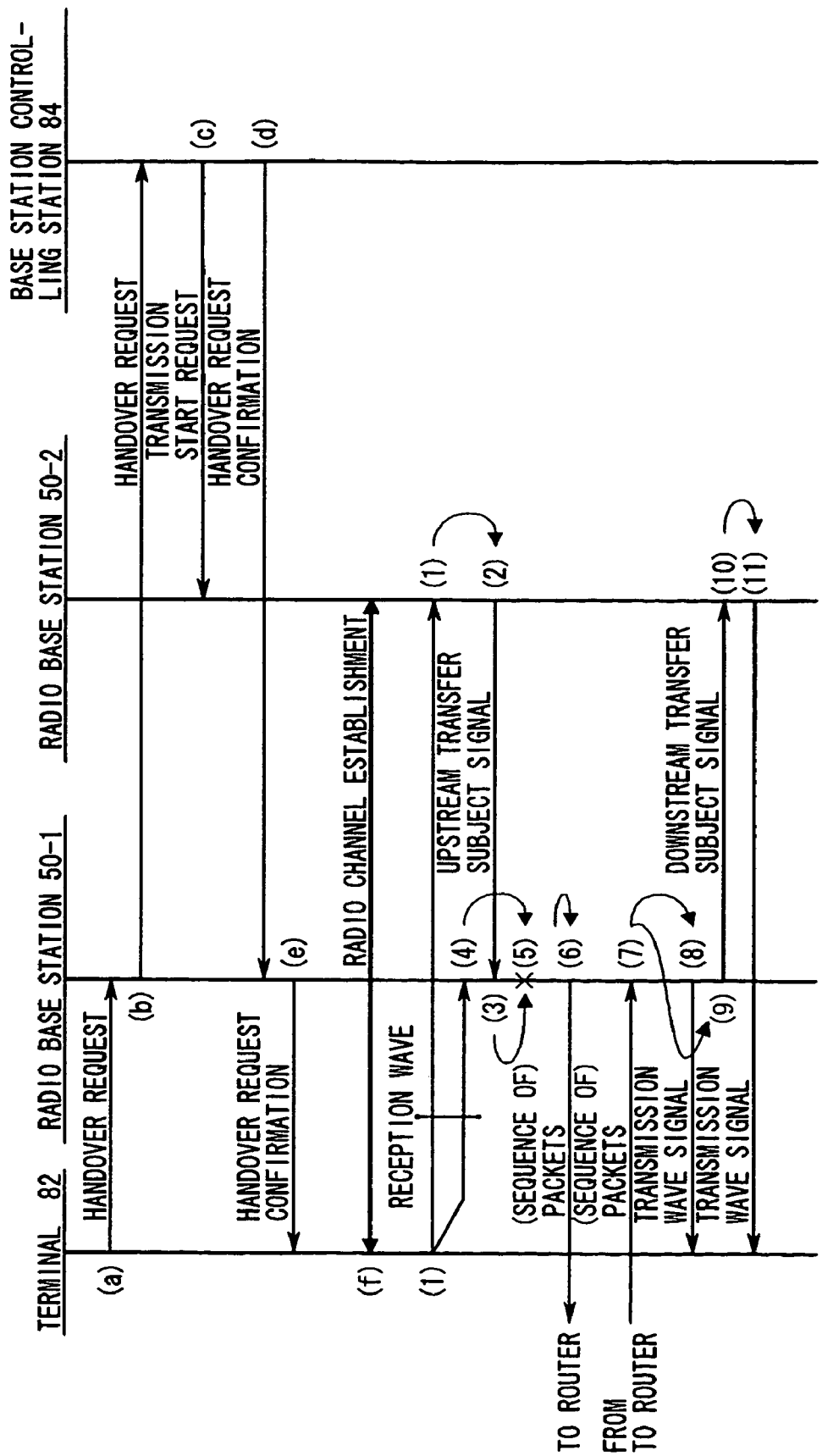

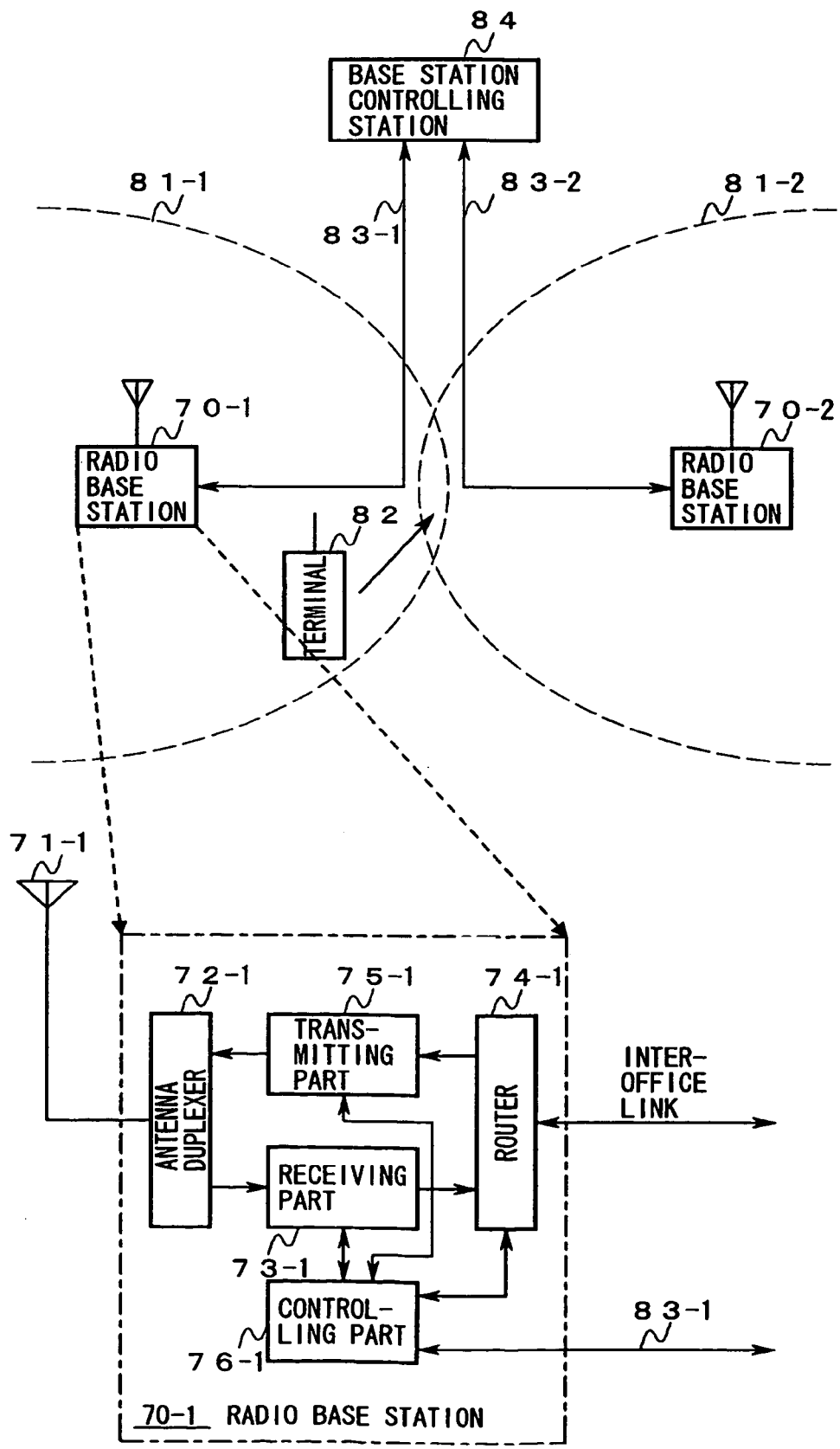
PRIOR ART  FIG. 6

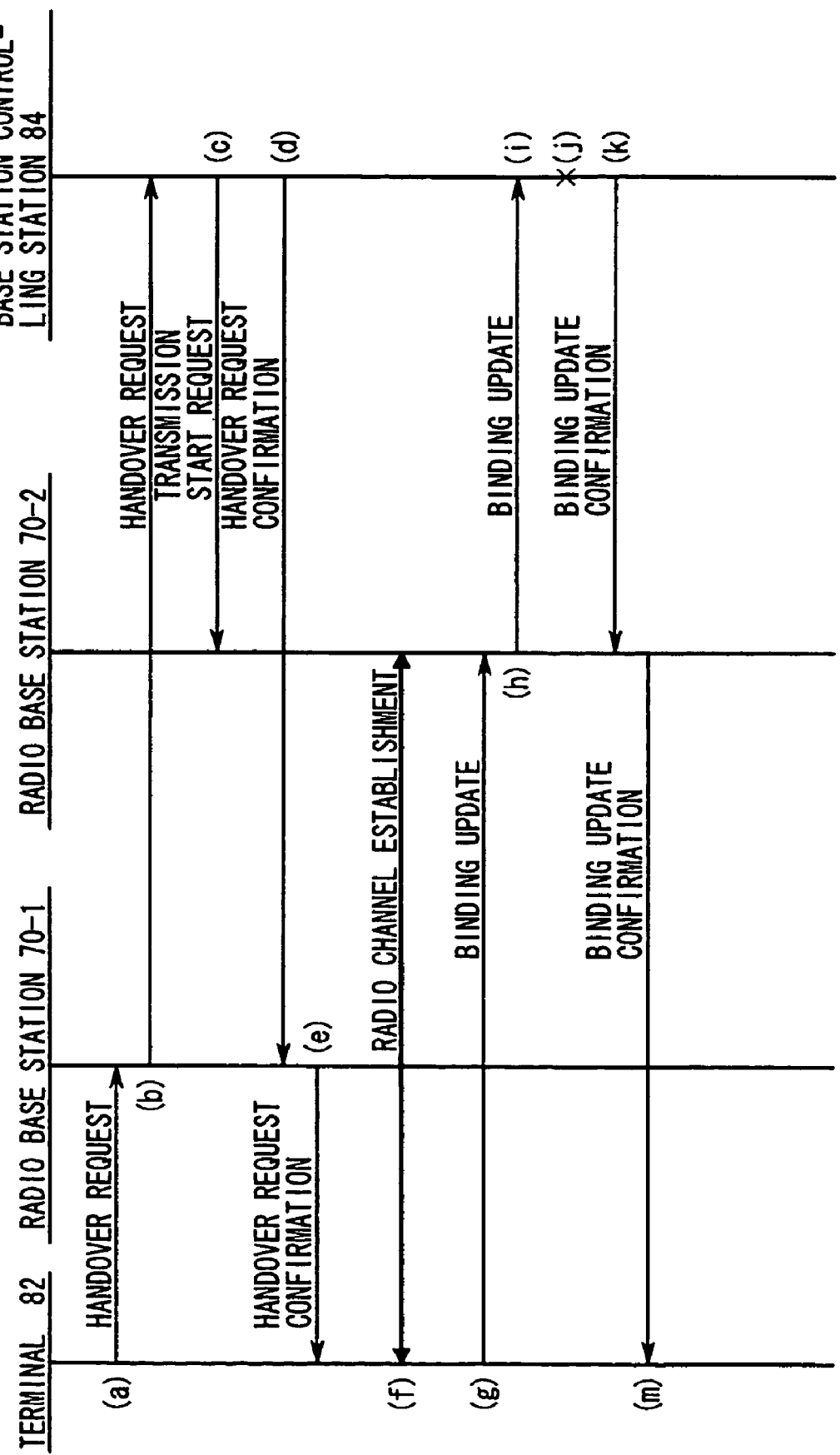

RADIO BASE STATION APPARATUS AND BASE STATION CONTROLLER

BACKGROUND OF THE INVENTION

1. Field of the Invention

The present invention relates to a radio base station apparatus that forms a wireless zone in a mobile communication system in which a terminal or a call occurring at a terminal is given different IP addresses for wireless zones. It also relates a base station controller that performs a channel control over a terminal visiting a wireless zone.

2. Description of the Related Art

In recent years, data terminals and communication terminals accessible to the Internet have spread rapidly. For radio transmission channels in next-generation mobile communication systems, use of the IP (Internet protocol) has been studied, because of its high compatibility with the Internet, for replacement the multiple access schemes which comply with the circuit switching system. Also, radio transmission channels and line transmission sections have become seamless step by step.

FIG. 6 shows the configuration of an exemplary mobile communication system in which different IP addresses are assigned for respective wireless zones.

As shown in FIG. 6, radio base stations 70-1 and 70-2 form overlapping wireless zones 81-1 and 81-2, respectively. A terminal 82 locates in one of the wireless zones 81-1 and 81-2, for example, in the wireless zone 81-1. The radio base stations 70-1 and 70-2 are connected to a base station controlling station 84 via communication links 83-1 and 83-2, respectively.

The radio base station 70-1 has the following components:
Antenna 71-1
Antenna duplexer 72-1 that is connected to the feeding point of the antenna 71-1.
Receiving part 73-1 that is connected to the reception output of the antenna duplexer 72-1.
Router 74-1 that is connected to the one end of an inter-office link provided between the radio base station 70-1 and an exchange (not shown), and to whose incoming route the output of the receiving part 73-1 is connected.
Transmitting part 77-1 that is connected in series to the outgoing route of the router 74-1 and whose output is connected to the transmission input of the antenna duplexer 72-1.
Controlling part 76-1 having input/output ports that are connected to the control terminals of the receiving part 73-1, the router 74-1, and the transmitting part 77-1, respectively, and a communication port that is connected to the one end of the above-mentioned communication link 83-1.

The radio base station 70-2 has the same configuration as the radio base station 70-1. Therefore, the components of the radio base station 70-2 will be given the same reference symbols as those of the radio base station 70-1 except that the former will have a suffix "2" instead of a suffix "1," and will not be described or shown in the drawings.

In the mobile communication system having the above configuration, the radio base stations 70-1 and 70-2 form wireless zones 81-1 and 81-2 that comply with a predetermined multiple access scheme and channel allocation, by cooperating with, via the respective communication links 83-1 and 83-2, the base station controlling station 84 performing a channel control and call setting in cooperation with the above-mentioned exchange.

Recognizing that a call that occurred at the terminal 82 has become a complete call during the course of such a channel control, the radio base station 70-1 assigns the terminal 82 a unique IP address (for the sake of simplicity, it is assumed here to be "192.168.0.2" and will be referred to as "first IP address") that is not assigned to any other terminals or calls.

When the terminal 82 has moved to the overlap region of the wireless zones 81-1 and 81-2 before the complete call disappears, it issues a handover request to the radio base station 70-1 according to a prescribed channel control procedure (indicated by symbol (a) in FIG. 7).

The radio base station 70-1 receives the handover request at the antenna 71-1, the antenna duplexer 72-1, and the receiving part 73-1 and the controlling part 76-1 thereof forwards it to the base station controlling station 84 via the communication link 83-1 (indicated by symbol (b) in FIG. 7).

The base station controlling station 84 performs the following processing in response to the handover request:
Determines a wireless zone (hereinafter referred to as "transition destination wireless zone"; for the sake of simplicity, it is assumed to be the wireless zone 81-2) to which the terminal 82 should make a transition.
Determines a radio channel (hereinafter referred to as "transition destination radio channel") that can be assigned by the radio base station 70-2 which forms the wireless zone 81-2 and that is not assigned to any terminal or call.
Sends, to the radio base station 70-2, via the communication link 83-2, a transmission start request for starting a transmission on the transition destination radio channel (indicated by symbol (c) in FIG. 7).
Sends, to the radio base station 70-1, via the communication link 83-1, a handover request confirmation that the terminal 82 should make a transition to the above transition destination radio channel (indicated by symbol (d) in FIG. 7).

During the above processing, the base station controlling station 84 may cooperate with the radio base station 70-2 in any form.

In the radio base station 70-1, when recognizing the handover request confirmation, the controlling part 76-1 sends the handover request confirmation to the terminal 82 via the transmitting part 77-1, the antenna duplexer 72-1, and the antenna 71-1 (indicated by symbol (e) in FIG. 7).

When recognizing the handover request confirmation, the terminal 82 performs the following processing:
Performs a series of operations (hereinafter referred to simply as "radio channel establishment") including synchronization establishment in the transition destination radio channel and a continuity check by cooperating, when necessary, with the radio base station 70-2 that forms the transition destination wireless zone (indicated by symbol (f) in FIG. 7).
When the radio channel establishment has completed normally, sends to the radio base station 70-2 a message called "binding update" which is an assignment request for a second IP address that complies with the transition destination wireless zone and is to replace the above-mentioned first IP address (indicated by symbol (g) in FIG. 7).

The radio base station 70-2 sends the binding update message to the base station controlling station 84 via the communication link 83-2.

Recognizing the binding update message, the base station controlling station 84 performs the following processing:
Secures an IP address (for the sake of simplicity, it is assumed here to be "192.168.1.2") as a second IP address by itself or in cooperation with the radio base station 70-2. The IP address is in such a value range that the radio base station 70-2 is allottable and is not assigned to any terminal or call (indicated by symbol (i) in FIG. 7). In the following description, for the sake of simplicity, it is assumed that the host address portions of the first IP address and the second IP address are defined under different subnet masks corresponding to the respective radio base stations 70-1 and 70-2 (wireless zones 81-1 and 81-2) so as to secure compatibility with the known mobile-IP that does not conform to the mobile communication and the radio transmission sufficiently.

Allows a relationship between the terminal 82 (or the transition destination channel assigned to the terminal 82) and the second IP address to be reflected in routing information held in the router 74-2 (indicated by symbol (j) in FIG. 7).

Sends a message "binding update confirmation" containing the second IP address to the terminal 82 via the communication link 83-2 and the radio base station 70-2 (indicated by symbol (k) in FIG. 7).

The terminal 82 completes the handover by using, as one of the following, the second IP address contained in the binding update confirmation as an IP address that has been assigned in place of the first IP address (indicated by symbol (m) in FIG. 7):

Transmission source address that should be placed in the header of each packet that is sent from the terminal 82 itself.

Address that should be placed in the header of each of packets to be directed to the terminal 82 itself among packets received from the radio base station 70-2 via the transition destination radio channel.

With the above processing, it is able to achieve a handover between the overlapping wireless zones 81-1 and 81-2 formed by the respective radio base stations 70-1 and 70-2 with high reliability, as long as the routers 74-1 and 74-2 of the radio base stations 70-1 and 70-2 are given proper pieces of routing information, and first and second IP addresses comply with those pieces of routing information.

The following documents disclose prior art techniques relating to the invention:

JP-A-2001-45534 (claims 4, 6, 8, and 9, paragraphs 0013, 0015, 0018, 0023, 0034, 0035, 0040-0042, 0044-0046, 0050, 0056-0058, 0060, 0063-0065, and 0067)

JP-A-2001-189954 (abstract, paragraph 0031)

JP-A-10-117167 (abstract, claim 1)

JP-A-11-122672 (claims 1-16)

JP-A-10-190633 (claim 1, paragraph 0001)

JP-T-10-509287 (abstract; the term "JP-T" as used herein means a published Japanese translation of a PCT patent application)

JP-A-2000-286898 (abstract, claim 1, paragraphs 0003 and 0016)

Incidentally, in the above prior art examples, a handover is attained by executing the second processing (indicated by symbols (g)-(m) in FIG. 7) for assignment of a second IP address that is to replace a first IP address after completion of the first processing (indicated by symbols (a)-(f) in FIG. 7) for realizing update of a physical radio channel.

That is, during such a handover process, every time the terminal 82 moves to a new wireless zone, it is given a new IP address as appropriate in accordance with a new radio channel that is physically different from an old one.

Therefore, the prior art examples enable transmission services of a variety of transmission information by using the IP; however, they cannot realize a diversity handover in accordance with substantially varying distances between the relative positions of the terminal 82 and the radio base stations 70-1 and 70-2 and according to the transmitting power control to solve the near-far problem of the CDMA scheme. Also, they cannot take advantage of merits of the CDMA scheme to maintain high, stable transmission quality of a radio transmission channel.

SUMMARY OF THE INVENTION

An object of the present invention is to provide a radio base station apparatus and a base station controller that realize a stable and reliable diversity handover without altering the basic configuration thereof to a large extent.

Another object of the invention is to keep high transmission quality and service quality at low cost irrespective of what configuration a mobile communication system has and of what form and information a unit of transmission including transmission information and transmitted via a radio transmission channel has.

Another object of the invention is to attain a diversity handover for an upstream radio transmission channel formed between the radio base station apparatus and a terminal or between the base station controller and the terminal.

Still another object of the invention is to attain a diversity handover for a downstream radio transmission channel formed between the radio base station apparatus and a terminal or between the base station controller and the terminal.

Yet another object of the invention is to allow the radio base station apparatus and the base station controller to be adaptable to various configurations of mobile communication systems, and to optimize the form of a diversity handover.

A further object of the invention is to allow the radio base station apparatus and the base station controller to be adaptable to an increase or a decrease in the number of wireless zones used for diversity handover, which changes due to movement of a terminal, as well as to reduce the number of links used for signal transfer between radio base stations.

The above objects are attained by a radio base station apparatus which delivers to a network a composite wave of a signal arriving from a terminal via a radio channel and signals arriving from a terminal in parallel at radio base stations forming adjacent wireless zones and forwarded therefrom, when a local station is a particular radio base station that is to maintain, during a process of a diversity handover, a radio channel between the radio base station apparatus and the terminal performing the diversity handover.

The radio base station apparatus according to the present invention combines signals that arrive thereat and at the above-described radio base stations forming adjacent wireless zones in parallel from the terminal via the radio channel and delivers the combined signals to the network in the baseband, intermediate frequency band, or radio frequency band.

The above objects are attained by a radio base station apparatus which forwards a signal arriving from a terminal in a wireless zone formed by the local station to a particular one of radio base stations that form wireless zones adjacent to the wireless zone formed by the local station, when the local station is not the above-mentioned particular radio base station.

The radio base station apparatus according to the invention combines a signal arriving thereat from the terminal via a radio channel and signals arriving in parallel directly at the particular radio base station from the terminal, and delivers the combined signals to a network in the baseband, intermediate frequency band, or radio frequency band.

The above objects are attained by a radio base station apparatus which forwards a signal delivered via a physical layer of a network to radio base stations that form adjacent wireless zones when the local station is the above-mentioned particular radio base station. The radio base station apparatus delivers the signal, which have been delivered from the network in the physical layer and is to be transmitted to the terminal from the local station (i.e., transmitting section), to the radio base stations in the baseband, intermediate frequency band, or radio frequency band.

The above objects are attained by a radio base station apparatus which transmits a signal forwarded from the above-mentioned particular radio base station, to a terminal via a wireless zone formed by the local station, when the local station is not the particular radio base station. This radio base station apparatus transmits, to the radio channel assigned to the terminal, signals delivered from the radio base stations forming the adjacent wireless zones in the baseband, intermediate frequency band, or radio frequency band.

The above objects are attained by a radio base station apparatus which secures, when appropriate, a link to be used for transfer of the signals from the radio base stations that form the adjacent wireless zones to the local station. This radio base station apparatus combines a signal with a signal arriving thereat from the terminal and delivers them to the network via the link secured by the inter-office link securing section.

The above objects are attained by a radio base station apparatus which secures, when appropriate, a link to be used for transfer of the signal to the particular radio base station. This radio base station apparatus delivers to another radio base station a signal arriving thereat from the terminal via the link secured by the inter-office link securing section.

The above objects are attained by a radio base station apparatus which secures, when appropriate, a link to be used for transfer of the signal to the radio base stations that form the adjacent wireless zones. This radio base station apparatus delivers a signal delivered from the network in the physical layer of the network, to another radio base station via the link secured by the inter-office link securing section.

The above objects are attained by a radio base station apparatus which secures, when appropriate, a link to be used for transfer of the signal from the particular radio station to the local station. In this radio base station apparatus, a transmitting section transmits a signal delivered from another radio base station, to the terminal via the link secured by the inter-office link securing section.

The above objects are attained by a base station controller which determines a particular ratio base station according to a channel control procedure when appropriate. This base station controller determines the particular radio base station according to all or part of the configurations of the wireless zones, the channel allocation, and the frequency allocation. And, the particular radio base station is not limited to a radio base station that forms a wireless zone where the terminal for which a diversity handover is performed locates when a complete call has occurred at the terminal or when the diversity handover is started.

The above objects are attained by a base station controlling station which changes the particular radio base station when appropriate during the course of a channel control. In such a base station controller, it is not always the case that the same radio base station continues to be the particular radio base station until a complete call occurring at a terminal for which a diversity handover is performed disappears. It is possible to change when appropriate the particular radio base station to a radio base station that forms a wireless zone where the diversity handover is performed in a suitable form for all or part of the configurations of the wireless zones, the channel allocation, and the frequency allocation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 illustrates the operations of the first and second embodiments of the invention;

FIG. 6 shows the configuration of an exemplary mobile communication system in which different IP addresses are assigned for respective wireless zones; and FIG. 7 shows a conventional handover process.

DESCRIPTION OF THE PREFERRED EMBODIMENTS

First, the principles of the present invention will be described.

Figure 1:
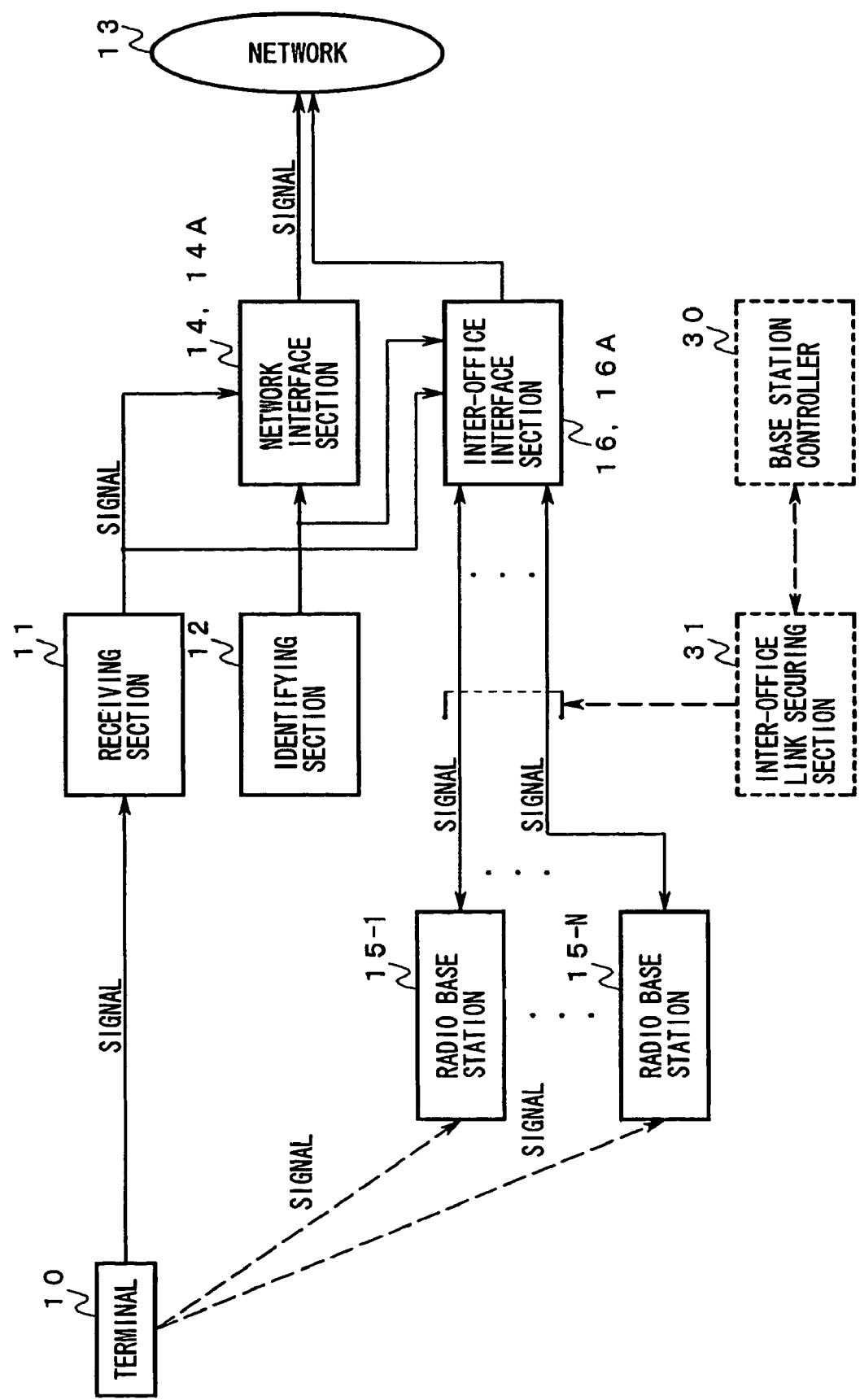
FIG. 1 is a first principle block diagram of radio base station apparatus according to the present invention.

FIG. 1 is a first principle block diagram of radio base station apparatus according to the invention.

Each of the radio base station apparatus of FIG. 1 is provided with (part of) a receiving section 11, an identifying section 12, a network interface section 14 or 14A, an inter-office interface section 16 or 16A, and an inter-office link securing section 31.

In a first radio base station apparatus according to the invention, the receiving section 11 receives a signal from a terminal 10 via a radio channel assigned to the terminal 10. The identifying section 12 identifies a particular radio base station that is to maintain the radio channel between the radio base station apparatus and the terminal 10 during a process of a diversity handover for the terminal 10. The network interface section 14 delivers the signal to a network 13 if the local station is not the particular radio base station. The inter-office interface section 16 delivers to the network 13 composite waves of the signal and signals that have arrived at radio base stations 15-1 to 15-N forming wireless zones adjacent to a wireless zone formed by the local station from the terminal 10 via the radio channel and that are forwarded therefrom, if the local station is the particular radio base station.

With this configuration, signals arriving in parallel at the radio base station apparatus according to the invention and the radio base stations 15-1 to 15-N from the terminal 10 via the radio channel are combined with each other and delivered to the network 13 in the baseband, intermediate frequency band, or radio frequency band.

Therefore, it is possible to realize a diversity handover for an upstream radio transmission channel formed between the local station and the terminal 10 as long as signals arriving at radio base stations 15-1 to 15-N that form the adjacent wireless zones from the terminal 10 are forwarded in the above-described manner.

In a second radio base station apparatus according to the invention, the receiving section 11 receives a signal from a terminal 10 via a radio channel assigned to the terminal 10. The identifying section 12 identifies a particular radio base station that is to maintain the radio channel between the radio base station apparatus and the terminal 10 during a process of a diversity handover for the terminal 10. The network interface section 14A delivers the signal to a network 13 if the local station is not the particular radio base station. The inter-office interface section 16A forwards the signal to the particular radio base station among radio base stations 15-1 to 15-N that form wireless zones adjacent to a wireless zone formed by the local station if the local station is not the particular radio base station.

With this configuration, a signal arriving at the radio base station apparatus according to the invention from the terminal 10 via the radio channel is delivered to the particular radio base station in the baseband, intermediate frequency band, or radio frequency band, as a signal that is to be combined with a signal arriving directly at the particular radio base station from the terminal 10 in parallel with the above signal and be forwarded to the network 13.

This makes it possible to realize a diversity handover for an upstream radio transmission channel formed between the local station and the terminal 10 as long as the signal combining and signal delivery to the network 13 are performed in the particular radio station.

Figure 2:
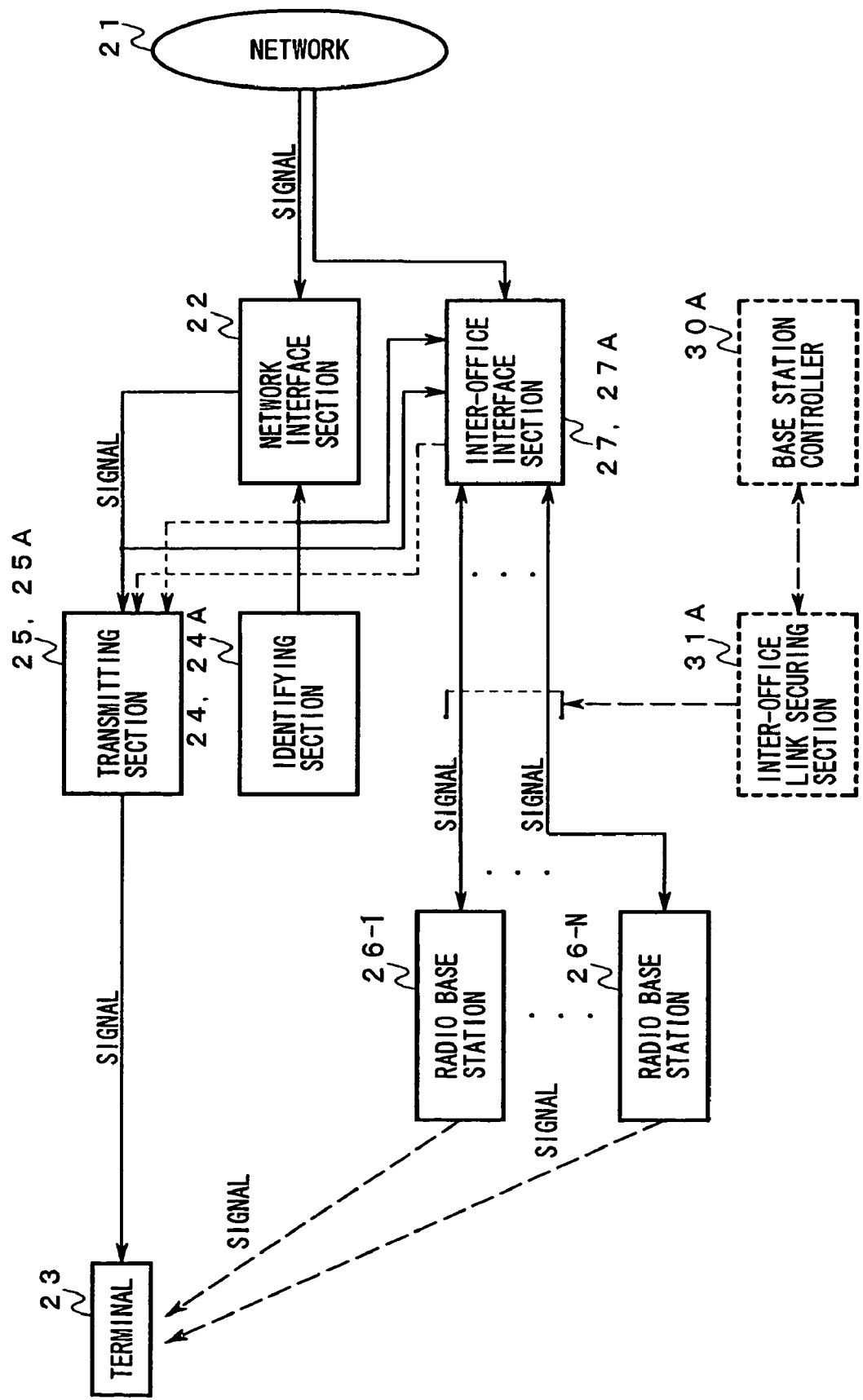
FIG. 2 is a second principle block diagram of radio base station apparatus according to the invention.

FIG. 2 is a second principle block diagram of radio base station apparatus according to the invention.

Each of the radio base station apparatus of FIG. 2 is provided with (part of) a network interface section 22, an identifying section 24 or 24A, a transmitting section 25 or 25A, an inter-office interface section 27 or 27A, and an inter-office link securing section 31A.

In a third radio base station apparatus according to the invention, the network interface section 22 captures a signal that is delivered from a network 21 in a physical layer of the network 21. The identifying section 24 identifies a particular radio base station that is to maintain a radio channel assigned to a terminal 23 as a receiving end of the signal during a process of a diversity handover for the terminal 23. The transmitting section 25 transmits the signal to the terminal 23 via the radio channel. The inter-office interface section 27 forwards the signal to radio base stations 26-1 to 26-N that form wireless zones adjacent to a wireless zone formed by the local station if the local station is the particular radio base station.

With this configuration, the signal having been delivered from the network 21 in the physical layer and is to be transmitted to the terminal 23 from the local station (i.e., transmitting section 25) is forwarded to the radio base stations 26-1 to 26-N that form the adjacent wireless zones in the baseband, intermediate frequency band, or radio frequency band. Therefore, it is possible realize a diversity handover for a downstream radio transmission channel formed between the local station and the terminal 23 as long as the radio base stations 26-1 to 26-N transmit the above signal to the terminal 23, and the signal is diversity-received at the terminal 23.

In a fourth radio base station apparatus according to the invention, the inter-office interface section 27A captures a signal whose destination is a terminal 23 and that have been forwarded from radio base stations 26-1 to 26-N that form wireless zones adjacent to a wireless zone formed by the local station. The identifying section 24A identifies a particular radio base station that is to maintain a radio channel assigned to the terminal 23 as a reception end of the signal during a process of a diversity handover for the terminal 23. The transmitting section 25A transmits the signal to the terminal 23 via the radio channel if the local station is not the particular radio base station.

With this configuration, signals delivered from the radio base stations 26-1 to 26-N that form the adjacent wireless zones in the baseband, intermediate frequency band, or radio frequency band are transmitted to the radio channel assigned to the terminal 23.

This makes it possible to realize a diversity handover for a downstream radio transmission channel formed between the local station and the terminal 23 as long as signals that arrive at the terminal 23 in parallel from the radio base station apparatus according to the invention and the radio base stations 26-1 to 26-N that form the adjacent wireless zones are diversity-received at the terminal 23.

In a fifth radio base station apparatus according to the invention, the inter-office link securing section 31 secures links to be used for transfer of signals between the local station and the radio base stations 15-1 to 15-N according to a procedure of a channel control for assigning the radio channel to the terminal 10 or through cooperation with the base station controller 30 performing the channel control. The inter-office interface section 16 combines the signals with signals that are forwarded via the links secured by the inter-office link securing section 31.

With this configuration, signals are delivered via the links secured by the inter-office link securing section 31 to be combined with a signal arriving at the radio base station apparatus according to the invention from the terminal 10 and delivered to the network 13.

This allows the radio base station apparatus to be adaptable to an increase or a decrease in the number of wireless zones used for a diversity handover for the terminal 10, which changes due to movement of the terminal 10, as well as to reduce the number of links used for delivering the signals.

In a sixth radio base station apparatus according to the invention, the inter-office link securing section 31 secures links to be used for transfer of the signal between the local station and the radio base stations 15-1 to 15-N according to a procedure of a channel control for assigning the radio channel to the terminal 10 or through cooperation with the base station controller 30 performing the channel control. The inter-office interface section 16A forwards the signal to the particular radio base station via the link secured by the inter-office link securing section 31.

With this configuration, signals having arrived at the radio base station apparatus according to the invention from the terminal 10 are delivered to other radio base stations via the links secured by the inter-office link securing section 31.

This allows the radio base station apparatus to be adaptable to an increase or a decrease in the number of wireless zones used for a diversity handover for the terminal 10, which changes due to movement of the terminal 10, as well as to reduce the number of links used for delivering the signals.

In a seventh radio base station apparatus according to the invention, the inter-office link securing section 31A secures links to be used for transfer of the signal between the local station and the radio base stations 26-1 to 26-N according to a procedure of a channel control for assigning the radio channel to the terminal 23 or through cooperation with the base station controller 30A for performing the channel control. The inter-office interface section 17 forwards the signal via the links secured by the inter-office link securing section 31A.

With this configuration, signals having been delivered from the network 21 in the physical layer of the network 21 are delivered to other radio base stations via the links secured by the inter-office link securing section 31A.

This allows the radio base station apparatus to be adaptable to an increase or a decrease in the number of wireless zones used for a diversity handover for the terminal 23, which changes due to movement of the terminal 23, as well as to reduce the number of links used for delivering the signals.

In an eighth radio base station apparatus according to the invention, the inter-office link securing section 31A secures links to be used for transfer of the signals between the local station and the radio base stations 26-1 to 26-N according to a procedure of a channel control for assigning the radio channel to the terminal 23 or through cooperation with the base station controller 30A performing the channel control. The inter-office interface section 27A captures signals that are forwarded via the links secured by the inter-office link securing section 31A.

With this configuration, the transmitting section 25A transmits signals delivered from other radio base stations to the terminal 23 via the links secured by the inter-office link securing section 31A.

This allows the radio base station apparatus to be adaptable to an increase or a decrease in the number of wireless zones used for a diversity handover for the terminal 23, which changes due to movement of the terminal 23, as well as to reduce the number of links used for delivering the signals.

Figure 3:
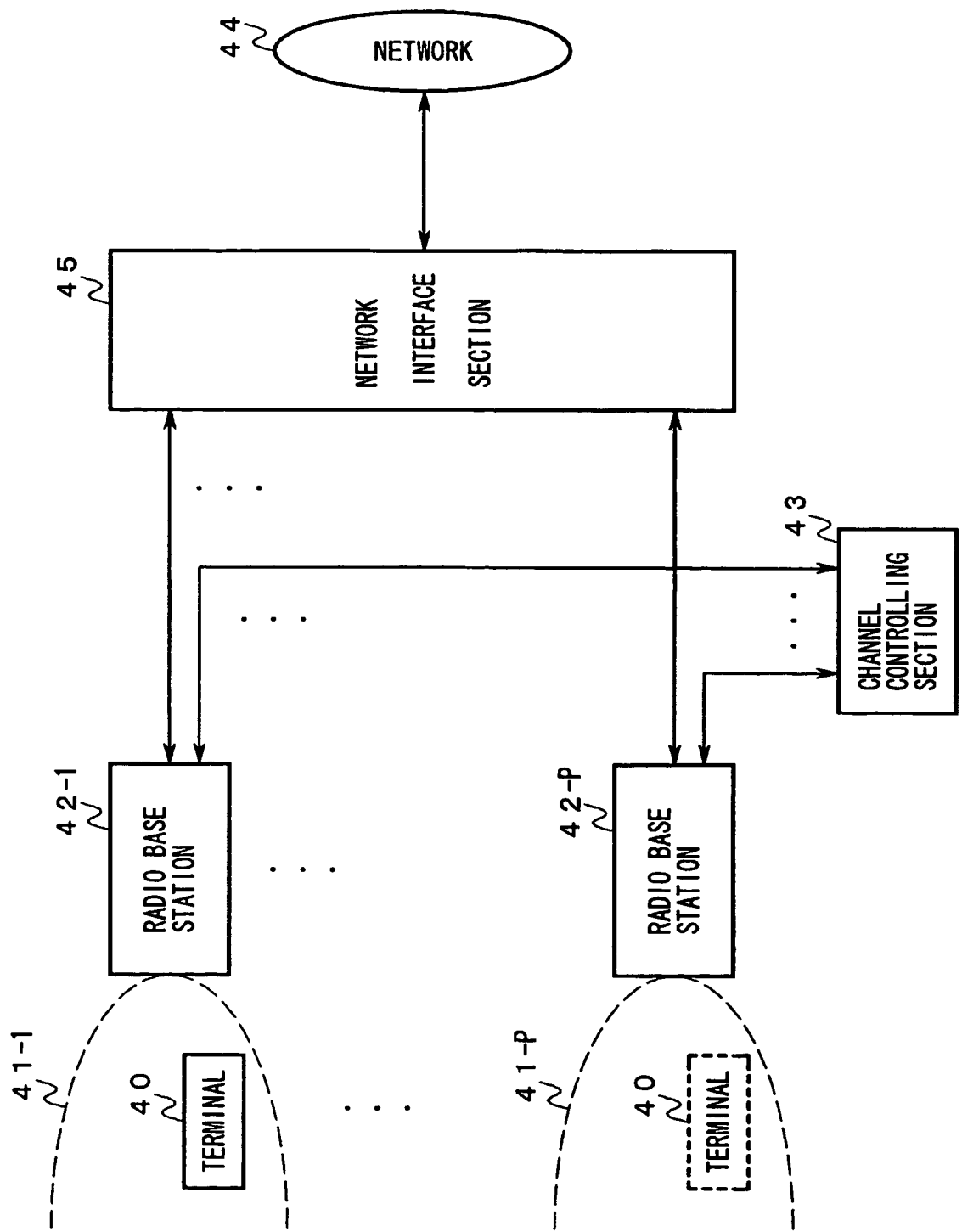
FIG. 3 is a principle block diagram of base station controllers according to the invention.

FIG. 3 is a principle block diagram of base station controllers according to the invention.

Each of the base station controllers of FIG. 3 is provided with a channel controlling section 43 and a network interface section 45.

In a first base station controller according to the invention, the channel controlling section 43 performs a channel control over a terminal 40 by cooperating with radio base stations 42-1 to 42-P that form wireless zones 41-1 to 41-P where the terminal 40 can visit. The network interface section 45 interfaces with a network 44, under the channel control, where a communication channel is to be formed between the base station controller and the terminal 40 via all or part of the radio base stations 42-1 to 42-P. The channel controlling section 43 determines a particular radio base station, which is to maintain a radio channel assigned to the terminal 40 during a process of a diversity handover for the terminal 40, according to the channel control and all or part of configurations of the wireless zones 41-1 to 41-P, channel allocation, and frequency allocation.

With this configuration, a particular ratio base station is determined as appropriate according to all or part of the configurations of the wireless zones 41-1 to 41-P, the channel allocation, and the frequency allocation, and it is not limited to a radio base station that forms a wireless zone where the terminal 40 for which a diversity handover is performed locates when a complete call has occurred at the terminal 40 or when the diversity handover is started.

This allows the base radio controller to be adaptable to various configurations of mobile communication systems, and can optimize the form of a diversity handover.

In a second base station controller according to the invention, the channel controlling section 43 performs the channel control such that a radio base station is to be the particular radio base station, the radio base station is the one to form a wireless zone where the diversity handover is done in a suitable manner for all or part of configuration of a wireless zone, channel allocation, and frequency allocation.

Therefore, It is not always the case that the same radio base station continues to be a particular radio base station until a complete call occurring at the terminal 40 for which a diversity handover is performed disappears. It is possible to change the particular radio base station as appropriate to a radio base station that forms a wireless zone where the diversity handover is performed in a suitable form for all or part of the configuration of a wireless zone, the channel allocation, and the frequency allocation.

This allows the base radio controller to be adaptable to various configurations of mobile communication systems, and can optimize the form of a diversity handover.

Embodiments of the present invention will be hereinafter described in detail with reference to the drawings.

Figure 4:
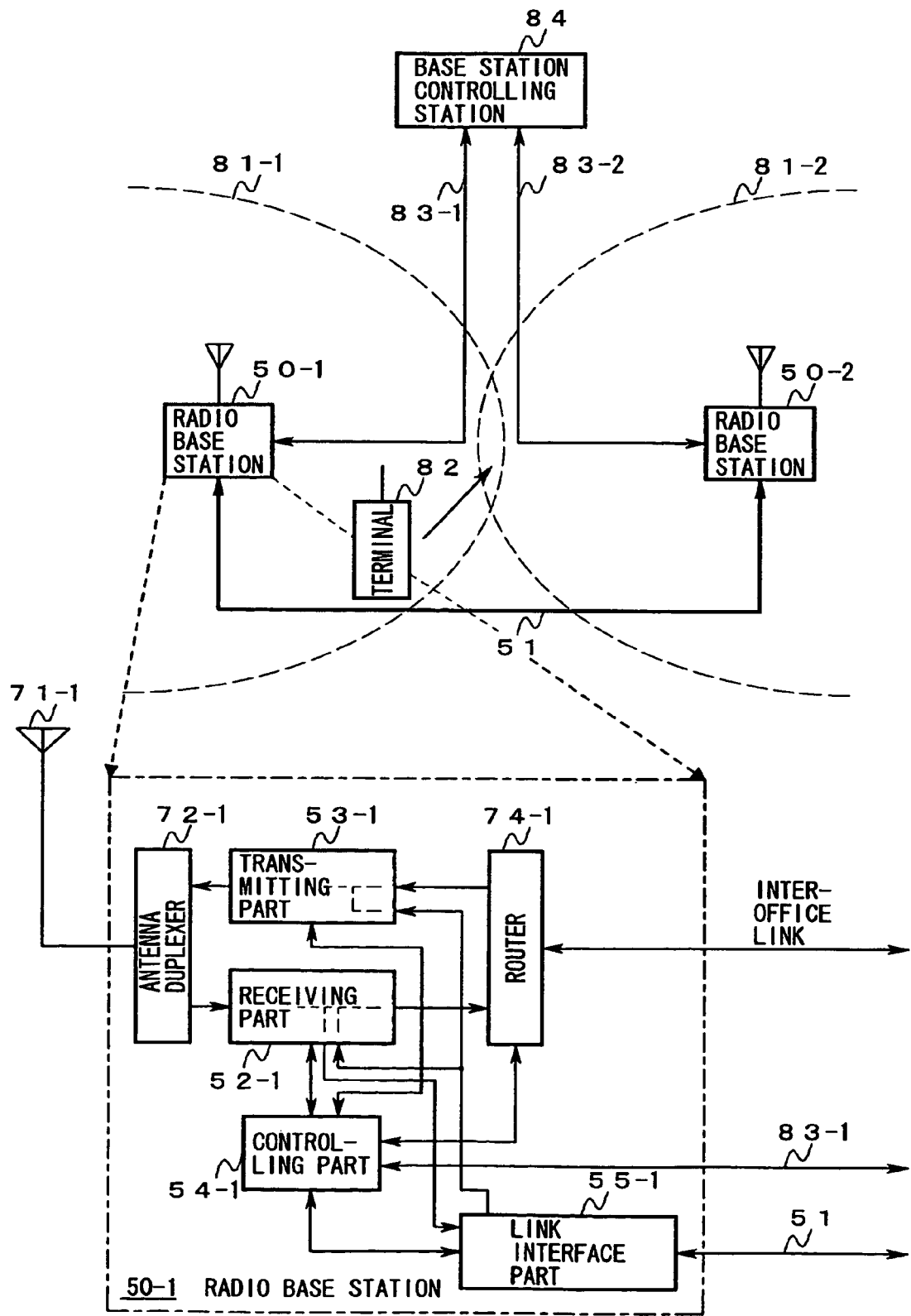
FIG. 4 shows first and second embodiments of the invention.

FIG. 4 shows first and second embodiments of the invention.

In the first and second embodiments, radio base stations 50-1 and 50-2 are provided in place of the radio base stations 70-1 and 70-2 of the conventional example and a bypass link 51 is provided between the radio base stations 50-1 and 50-2.

The radio base station 50-1 is different from the radio base station 70-1 shown in FIG. 6 in the following points:

(1) A receiving part 52-1, a transmitting part 53-1, and a controlling part 54-1 are provided in place of the receiving part 73-1, the transmitting part 75-1, and the controlling part 76-1, respectively.

(2) A link interface section 55-1 is provided which is connected to one end of the bypass link 51 and has the following terminals:

Control terminal that is connected to a corresponding input/output port of the controlling part 54-1.

Reception output that is connected to baseband inputs of the receiving part 52-1 and the transmitting part 53-1.

Transmission input that is connected to a baseband output of the receiving part 52-1.

FIG. 5 illustrates the operations of the first and second embodiments of the invention. The operation of the first embodiment according to the invention will be described below with reference to FIGS. 4 and 5.

As in the case of the conventional example, the base station controlling station 84 plays a leading role in performing a channel control relating to the wireless zones 81-1 and 81-2 by cooperating with the radio base stations 50-1 and 50-2 via the communication links 83-1 and 83-2.

In addition to the above channel control, the base station controlling station 84 manages, as resources, in a unified manner, a plurality of channels (hereinafter referred to as "bypass channels") that are formed in the bypass link 51 according to a prescribed multiple access scheme.

In the following description, an item common to the radio base stations 50-1 and 50-2 may be described by using a reference symbol having a suffix "C" which corresponds to either of suffixes "1" and "2."

In the radio base station 50-C, the controlling part 54-C performs the following processing for a radio channel for which the radio base station 50-C does not relate to a diversity handover at all:

Instructs the receiving part 52-C and the transmitting part 53-C that they should perform the same processing as in the conventional example.

Instructs the link interface part 55-C that it need not perform any special processing.

The radio base stations 50-1 and 50-2 form the wireless zones 81-1 and 81-2 that comply with a prescribed multiple access scheme and channel allocation by cooperating with, via the respective communication links 83-1 and 83-2, the base station controlling station 84 that performs a channel control and also performs call setting by cooperating with the above-mentioned exchange.

When recognizing that a call that occurred at the terminal 82 has become a complete call during the course of such a channel control, the radio base station 50-1 assigns the terminal 82 a unique first IP address that is not assigned to any other terminals or calls.

In the following description, the wireless zone 81-1 where the terminal 82 exists at an instant when the complete call has occurred will be referred to as a particular wireless zone. A radio channel that is assigned to the complete call (i.e., terminal 82) at this time will be referred to as a particular radio channel.

When the terminal 82 has moved to the overlap region of the wireless zones 81-1 and 81-2 before the complete call disappears, the terminal 82 sends a handover request to that effect to the radio base station 50-1 according to a prescribed channel control procedure (indicated by symbol (a) in FIG. 5).

In the radio base station 50-1 the controlling part 54-c forwards, to the base station controlling station 84, via the communication link 83-1, the handover request that has been received at the antenna 71-1, the antenna duplexer 72-1, and the receiving part 52-1 (indicated by symbol (b) in FIG. 5).

The base station controlling station 84 performs the following processing in response to the handover request:

Determines a wireless zone (hereinafter referred to as "joint wireless zone"; for the sake of simplicity, it is assumed to be the wireless zone 81-2) that the terminal 82 should use jointly for the diversity handover.

Determines a radio channel (hereinafter referred to as "joint radio channel") that can be assigned by the radio base station 50-2 forming the wireless zone 81-2 and that is not assigned to any terminal or call.

Sends, to the radio base station 50-2, via the communication link 83-2, a transmission start request that a transmission on the joint radio channel should be started (indicated by symbol (c) in FIG. 5).

Sends, to the radio base station 50-1, via the communication link 83-1, a handover request confirmation that the terminal 82 can access the downstream link of the joint radio channel (indicated by symbol (d) in FIG. 5).

During the above processing, the base station controlling station 84 may cooperate with the radio base station 50-2 in any form.

In the radio base station 50-1, when recognizing the handover request confirmation, the controlling part 54-1 sends the handover request confirmation to the terminal 82 via the transmitting part 53-1, the antenna duplexer 72-1, and the antenna 71-1 (indicated by symbol (e) in FIG. 5).

Further, at the time of the sending, the controlling part 54-1 recognizes that for the diversity handover for the terminal 82, the terminal 82 itself is a particular radio base station that should play a leading role in forming and maintaining a radio transmission channel involving the terminal 82.

On the other hand, in the radio base station 50-2, the controlling part 54-2 recognizes that the radio base station 50-2 is not the above-mentioned particular radio base station, in response to the transmission start request.

When recognizing the handover request confirmation, the terminal 82 performs a series of operations (hereinafter referred to simply as "radio channel establishment") including synchronization establishment in the joint radio channel and a continuity check by cooperating, when necessary, with the radio base station 50-2 that forms the joint wireless zone (indicated by symbol (f) in FIG. 5).

When the joint radio channel to be used for the diversity handover for the terminal 82 has been secured in this manner, the base station controlling station 84 assigns a free, unique bypass channel (hereinafter referred to simply as "bypass channel") among the above-mentioned plurality of bypass channels for each of pairs of each joint radio channel and the particular radio channel by cooperating with the radio base stations 50-1 and 50-2 (controlling parts 54-1 and 54-2) that form the particular wireless zone and all the joint wireless zones, respectively (for the sake of simplicity, it is assumed that only the wireless zone 81-2 exists).

In the radio base station 50-2, the controlling part 54-2 gives the receiving part 52-2, the transmitting part 53-2, and the link interface part 55-2 binary information indicating that the radio base station 50-2 is not the above-mentioned particular radio base station.

The receiving part 52-2, the transmitting part 53-2, and the link interface part 55-2 perform the following processing in accordance with the logical value of the binary information:

The receiving part 52-2 generates a baseband signal by despreading a reception wave that has arrived from the terminal 82 (indicated by symbol (1) in FIG. 5) and has been supplied via the antenna 71-2 and the antenna duplexer 72-2 and passes the generated baseband signal (hereinafter referred to as "upstream transfer subject signal") to the link interface part 55-2 without performing decision decoding or transmission channel decoding on it.

The link interface part 55-2 forwards the upstream transfer subject signal to the radio base station 50-1 via the bypass channel (indicated by symbol (2) in FIG. 5). On the other hand, in the radio base station 50-1, the controlling part 54-1 gives the receiving part 52-1, the transmitting part 53-1, and the link interface part 55-1 binary information indicating that the radio base station 50-1 is the above-mentioned particular radio base station.

The receiving part 52-1, the transmitting part 53-1, and the link interface part 55-1 perform the following processing in accordance with the logical value of the binary information:

The link interface part 55-1 passes the above-mentioned upstream transfer subject signal to the receiving part 52-1 (indicated by symbol (3) in FIG. 5).

The receiving part 52-1 generates a baseband signal by despreading a reception wave that has arrived from the terminal 82 in parallel with the above-mentioned reception wave and has been supplied via the antenna 71-1 and the antenna duplexer 72-1 (indicated by symbol (4) in FIG. 5) and generates a replacement baseband signal to replace the generated baseband signal by combining the baseband signal and the upstream transfer subject signal (indicated by symbol (5) in FIG. 5).

Further, the receiving part 52-1 restores packets indicated by the replacement baseband signal by performing decision decoding and transmission channel decoding on the replacement baseband signal and gives the (sequence of) packets to the router 74-1 (indicated by symbol (6) in FIG. 5).

The transmitting part 53-1 generates a transmission wave signal indicating the packets that have been given by the router 74-1 and are to be transmitted to the terminal 82 (indicated by symbol (7) in FIG. 5), and sends the generated transmission wave signal to the terminal 82 via the antenna duplexer 72-1, the antenna 71-1, and the downstream link of the above-mentioned particular radio channel (indicated by symbol (8) in FIG. 5).

In generating the transmission wave, the transmitting part 53-1 passes, to the link interface part 55-1, a baseband signal (hereinafter referred to as "downstream transfer subject signal") that is modulated by the above-mentioned packets and is a subject of spreading that is performed in generating the transmission wave.

The link interface part 55-1 forwards the downstream transfer subject signal to the radio base station 50-2 via the bypass channel (indicated by symbol (9) in FIG. 5).

In the radio base station 50-2, the link interface part 55-2 and the transmitting part 53-2 performs the following processing in accordance with the logical value of the above-mentioned binary information:

The link interface part 55-2 receives the downstream transfer subject signal via the bypass signal and passes it to the transmitting part 53-2 (indicated by symbol (10) in FIG. 5).

The transmitting part 53-2 sends a transmission wave signal generated on the basis of the downstream transfer subject signal according to a direct sequence scheme to the terminal 82 via the antenna duplexer 72-2, the antenna 71-2, and the downstream link of the above-mentioned joint radio channel (indicated by symbol (11) in FIG. 5).

That is, a reception wave sent from the terminal 82 to the radio base station 50-2 being not the particular radio base station is forwarded to the particular radio base station 50-1 as an upstream transfer subject signal. The upstream transfer subject signal thus forwarded is combined with a baseband signal that has been generated by despreading a reception wave that has arrived at the radio base station 50-1 in parallel with the above transmission wave, and a combined signal is subjected to demodulation, decision decoding, etc. Resulting (sequence of) packets are given to the router 74-1 as a subject of routing.

The (sequence of) packets that have been given by the router 74-1 and are to be transmitted to the terminal 82 are directly radio-transmitted from the particular radio base station 50-1 to the terminal 82 and are also forwarded to the radio base station 50-2 being not the particular radio base station as a downstream transfer subject signal. The radio base station 50-2 radio-transmits the downstream transfer subject signal to the terminal 82 in parallel with the above (sequence of) packets.

Therefore, according to this embodiment, a diversity handover can be attained in a stable manner though the IP is applied to the radio transmission sections, because an upstream transfer subject signal and a downstream transfer subject signal are forwarded in the baseband via the bypass link 51, and the radio base stations 50-1 and 50-2 cooperate with each other in the above-described manner.

The operation of the second embodiment of the invention will be described below with reference to FIG. 4.

This embodiment is characterized in the following processing procedure that is followed by the base station controlling station 84.

Cooperating with the subordinate radio base stations (including the radio base stations 50-1 and 50-2), the base station controlling station 84 recognizes the particular radio base station for each terminal that performs a diversity handover and judges whether the particular radio base station is suitable for continuation of the diversity handover on the basis of zone configurations of wireless zones formed by those radio base stations, channel allocation, frequency allocation, a modulation scheme, and a multiple access scheme.

Further, when the judgment result is false, the base station controlling station 84 performs the following processing in cooperation with the particular radio base station and other radio base stations among the radio base stations that should be involved in the diversity handover concerned:

Determines a new particular radio base station.

Regards the new particular radio base station as a transition destination (e.g., corresponds to the radio base station 70-2 in the conventional example) of a hard handover rather than a diversity handover.

After completion of radio channel establishment for the transition destination, instructs the new particular radio base station to perform binding update by cooperating with the terminal 82 in the same manner as in the conventional example (indicated by symbols (g)-(m) in FIG. 7).

Therefore, this embodiment can prevent a state that continuance of a same radio base station being the particular radio base station from occurrence of a complete call at the terminal 82 to disappearance of the call causes the diversity handover not to properly comply with the above-mentioned zone configurations, channel allocation, frequency allocation, modulation scheme, and multiple access scheme, which lowers the transmission quality and service quality, complicates the processings related to the channel control, and increases the load.

This embodiment has not described specific criteria for the selection of a new particular radio base station. However, a new particular radio base station may be selected on any criteria in any of the following manners as long as desired service quality and transmission quality are secured under the configuration of a mobile communication system to which the invention is applied without undue cost increase:

Optimize the combination of wireless zones that should be used jointly during a diversity handover and reduce the number of joint wireless zones by preferentially selecting, according to the zone sizes and allocation and past results, a radio base station that forms a wireless zone the terminal 82 is likely to continue to visit.

Deterioration in transmission quality or service quality can be avoided by preferentially selecting a radio base station that forms a wireless zone other than wireless zones that are small in traffic and hence are not prone to interference.

In each of the above embodiments, an upstream transfer subject signal and a downstream transfer subject signal are passed as signals in the baseband between the radio base stations 50-1 and 50-2 via a bypass channel (i.e., the bypass link 51). However, an upstream transfer subject signal and a downstream transfer subject signal may be signals in a desired intermediate frequency band or radio frequency band as long as they are generated in the physical layer and modulated by packets to be passed between the terminal 82 and the router of a particular radio base station.

Each of the above embodiments has not described the number of bypass channels that can be formed in parallel in the bypass link 51 specifically. However, the number of bypass channels may be any number as long as bypass channels are assigned properly to calls and terminals as subjects of diversity handovers in such a manner as to conform to the topology and the transmission scheme of the bypass link 51.

In each of the above embodiments, a bypass channel is assigned as appropriate to a call and a terminal as a subject of a diversity handover under the control of the base station controlling station 84. However, for example, a bypass channel may be assigned under the control of a particular radio base station that is determined uniquely during the course of a channel control or under cooperation between radio base stations that can be involved in a diversity handover as long as the bypass channel assignment is performed properly so as to conform to the topology and the transmission scheme of the bypass link 51.

In each of the above embodiments, for example, the bypass link 51 may be formed in advance as a set of bypass channels that are uniquely correlated with radio channels that can be assigned to complete calls in parallel by each radio base stations and the assignment of the radio channels and the assignment of the bypass channels may be unified with each other as long as they conform to the topology and the transmission scheme of the bypass link 51.

In each of the above embodiments, in a joint wireless zone, the terminal 82 is assigned a full-duplex joint radio channel that consists of the same upstream link as the upstream link of a particular radio channel and a downstream link that is different from the downstream link of the particular radio channel. However, the joint radio channel may be any of the following radio channels:

Radio channel whose upstream and downstream links are different from the upstream and downstream links of a particular radio channel, respectively.

Radio channel whose upstream and downstream links are common to the upstream and downstream links of a particular radio channel, respectively.

Each of the above embodiments has not disclosed specifically about a multiple access scheme, a modulation scheme, channel allocation, zone configurations, and frequency allocation that closely relate to the formation and assignment of such a radio channel. However, such a radio channel may be formed by using a plurality of desired multiple access schemes as long as a radio channel is recognized reliably under a channel control and the above-described diversity handover is realized.

In each of the above embodiments, the invention is applied to the diversity handover that is performed in a duplex-operation mobile communication system. However, the application of the invention is not limited to such mobile communication systems and the invention can also be applied to simplex-operation and semi-duplex-operation mobile communication systems.

Each of the above embodiments has not disclosed specifically about a multiple access scheme that should be applied to the bypass link 51. However, any of CDMA (code division multiple access), TDMA (time division multiple access), FDMA (frequency division multiple access), and combinations of these multiple access schemes may be applied to the bypass link 51 as long as high transmission quality is attained without impairing combining processing for realizing a diversity handover, and a bypass channel can be assigned reliably to a call or a terminal as a subject of the diversity handover.

In each of the above embodiments, the router 74-C is provided in the radio base station 50-C. However, the router 74-C may be provided as an apparatus that is separate from the radio base station 50-C or may be a router that is common to a plurality of radio base stations.

In each of the above embodiments, the router 74-C may have function of routing in a private network between a base station controller and radio base stations formed and operated by a communication company and/or a gateway interfacing with a public network.

The invention is not limited to the above embodiments and various modifications may be made without departing from the spirit and scope of the invention. Any improvement may be made in part or all of the components.

What is claimed is:

1. A radio communication method comprising:
    transmitting data and identification information allotted to a radio terminal to the radio terminal from a first and a second radio base stations in a diversity transmission manner; and
    transmitting the data and a renewal identification information different from the identification information to the radio terminal from a third base station when the radio terminal moves from an area of the first and second base station to an area of a third base station, wherein
    the first radio base station transmits primary information and the second radio base station transmits secondary information, the primary information and the secondary information including same content information, and
    the radio terminal in diversity receives the primary information and the secondary information.

2. A radio communication method comprising:
    maintaining identification information allotted to a radio terminal for receiving data without renewing the identification information when the radio terminal moves from an area of a first radio base station to an area of a second radio base station, and transmitting data and the identification information to the radio terminal from the first and second radio base stations in a diversity transmission manner; and
    renewing the identification information when the radio terminal moves to an area of a third base station, and transmitting data and the renewed identification information to the radio terminal from the third radio base station, wherein
    the third base station belongs to a mobile zone which is different from a mobile zone which the first and second base stations using the diversity transmission manner belong to.

3. The radio communication method according to claim 1, wherein the identification information is an IP address.

4. The radio communication method according to claim 1, wherein the renewed identification information is different from the identification information before the renewal.

5. The radio communication method according to claim 1, wherein
    the third radio base station transmits information without forming diversity transmission relation with the first radio base station for transmission of the information.

6. The radio communication method according to claim 5, wherein the identification information and the renewed identification information are unique.

7. A radio system performing radio communication with a radio terminal comprising:
    a first transmitting unit transmitting data and identification information allotted to the radio terminal to the radio terminal from a first and a second radio base stations in a diversity transmission manner; and
    a second transmitting unit transmitting the data and a renewal identification information different from the identification information to the radio terminal from a third base station when the radio terminal moves from an area of the first and second base station to an area of a third base station.

8. A radio system performing radio communication with a radio terminal comprising:
    a second radio base station maintaining identification information allotted to the radio terminal for receiving data without renewing the identification information when the radio terminal moves from an area of a first radio base station to an area of the second radio base station, and transmitting data and the identification information to the radio terminal from the first and second radio base stations in a diversity transmission manner; and
    a third base station renewing the identification information when the radio terminal moves to an area of the third base station, and transmitting data and the renewed identification information to the radio terminal from the third radio base station, wherein the third base station belongs to a mobile zone which is different from a mobile zone which the first and second base stations using the diversity transmission manner belong to.

9. The radio system according to claim 7, wherein the identification information is an IP address.

10. The radio system according to claim 7, wherein the renewed identification information is different from the identification information before the renewal.

11. The radio system according to claim 7, wherein
the first radio base station transmits primary information and the second radio base station transmits secondary information, the primary information and the secondary information including same content information,
the radio terminal in diversity receives the primary information and the secondary information, and
the third radio base station transmits information without forming diversity transmission relation with the first radio base station for transmission of the information.

12. The radio system according to claim 11, wherein the identification information and the renewed identification information are unique.

13. A radio terminal performing radio communication with radio base stations comprising:
a first transmitting unit transmitting data and identification information allotted to the radio terminal to the radio terminal from a first and a second radio base stations in a diversity transmission manner; and
a second transmitting unit transmitting the data and a renewal identification information different from the identification information to the radio terminal from a third base station when the radio terminal moves from an area of the first and second base station to an area of a third base station.

14. A radio terminal performing radio communication with radio base stations comprising:
a second radio base station maintaining identification information allotted to the radio terminal for receiving data without renewing the identification information when the radio terminal moves from an area of a first radio base station to an area of the second radio base station, and transmitting data and the identification information to the radio terminal from the first and second radio base stations in a diversity transmission manner; and
a third base station renewing the identification information when the radio terminal moves to an area of the third base station, and transmitting data and the renewed identification information to the radio terminal from the third radio base station, wherein
the third base station belongs to a mobile zone which is different from a mobile zone which the first and station base stations using the diversity transmission manner belong to.

15. The radio terminal according to claim 13, wherein the identification information is an IP address.

16. The radio terminal according to claim 13, wherein the renewed identification information is different from the identification information before the renewal.

17. The radio terminal according to claim 13, wherein
the first radio base station transmits primary information and the second radio base station transmits secondary information, the primary information and the secondary information including same content information,
the radio terminal in diversity receives the primary information and the secondary information, and
the third radio base station transmits information without forming diversity transmission relation with the first radio base station for transmission of the information.

18. The radio terminal according to claim 17, wherein the identification information and the renewed identification information are unique.

\* \* \* \* \*